United States Patent
Chen et al.

(10) Patent No.: US 9,642,153 B2
(45) Date of Patent: May 2, 2017

(54) METHODS FOR ONE RADIO MODULE TO LISTEN TO PAGING SIGNALS WITHOUT BREAKING THE DATA TRANSMISSION OF THE OTHER RADIO MODULE OPERATING IN THE CONNECTED MODE AND COMMUNICATION APPARATUSES UTILIZING THE SAME

(71) Applicant: MediaTek Inc., Hsin-Chu (TW)

(72) Inventors: Ju-Ya Chen, Kaohsiung (TW); Yu-Chuan Lin, New Taipei (TW); Da-shan Shiu, Taipei (TW); Yih-Shen Chen, Hsinchu (TW); Chia-Hao Yu, Yilan (TW)

(73) Assignee: MEDIATEK INC., Hsin-Chu (TW)

( * ) Notice: Subject to any disclaimer, the term of this patent is extended or adjusted under 35 U.S.C. 154(b) by 233 days.

(21) Appl. No.: 14/049,341

(22) Filed: Oct. 9, 2013

(65) Prior Publication Data
US 2015/0098376 A1    Apr. 9, 2015

(51) Int. Cl.
*H04W 72/12* (2009.01)
*H04W 72/10* (2009.01)
(Continued)

(52) U.S. Cl.
CPC ....... *H04W 72/1215* (2013.01); *H04W 72/10* (2013.01); *H04W 52/0241* (2013.01); *H04W 88/06* (2013.01)

(58) Field of Classification Search
None
See application file for complete search history.

(56) References Cited

U.S. PATENT DOCUMENTS

| 8,811,353 B2 | 8/2014 | Chen et al. |
| 2005/0245253 A1* | 11/2005 | Khushu ............... G01S 19/24 455/423 |

(Continued)

FOREIGN PATENT DOCUMENTS

| CN | 101521959 | 9/2009 |
| CN | 101707814 | 5/2010 |

(Continued)

OTHER PUBLICATIONS

English language translation of abstract of CN 101521959 (published Sep. 2, 2009).

(Continued)

*Primary Examiner* — Yaotang Wang
(74) *Attorney, Agent, or Firm* — McClure, Qualey & Rodack, LLP

(57) ABSTRACT

In a communications apparatus first radio module communicates with a first wireless network and provides wireless communication services in compliance with a first RAT. A second radio module communicates with a second wireless network and provides wireless communication services in compliance with a second RAT. At least two antennas are shared by the first radio module and the second radio module. When the first radio module operates in an idle mode and when the timing of the first radio module performing a first receiving activity coincides with the timing of the second radio module performing a second receiving activity, the second radio module uses the antennas to perform the second receiving activity when a DRX cycle duration of the first radio module in the idle mode is shorter than a DRX cycle duration of the second radio module.

16 Claims, 5 Drawing Sheets

(51) Int. Cl.
*H04W 88/06* (2009.01)
*H04W 52/02* (2009.01)

(56) References Cited

U.S. PATENT DOCUMENTS

| | | |
|---|---|---|
| 2009/0215491 A1 | 8/2009 | Hou et al. |
| 2010/0075672 A1 | 3/2010 | Jwa et al. |
| 2010/0260147 A1 | 10/2010 | Xing et al. |
| 2011/0142147 A1 | 6/2011 | Chen et al. |
| 2011/0207453 A1 | 8/2011 | Hsu et al. |
| 2013/0148636 A1* | 6/2013 | Lum et al. ............... 370/336 |
| 2013/0189969 A1 | 7/2013 | Periyalwar et al. |
| 2013/0201890 A1* | 8/2013 | Swaminathan et al. ...... 370/311 |
| 2013/0307727 A1 | 11/2013 | He et al. |
| 2014/0349646 A1* | 11/2014 | Su et al. ................... 455/436 |
| 2014/0355505 A1 | 12/2014 | Su et al. |
| 2015/0009836 A1 | 1/2015 | Tujkovic et al. |

FOREIGN PATENT DOCUMENTS

| | | |
|---|---|---|
| CN | 102017451 | 4/2011 |
| CN | 102170680 | 8/2011 |
| EP | 2 432 288 | 3/2012 |
| WO | WO 2011/038677 | 4/2011 |

OTHER PUBLICATIONS

English language machine translation of CN 101707814 (published May 12, 2010).
English language machine translation of CN 102017451 (published Apr. 13, 2011).

* cited by examiner

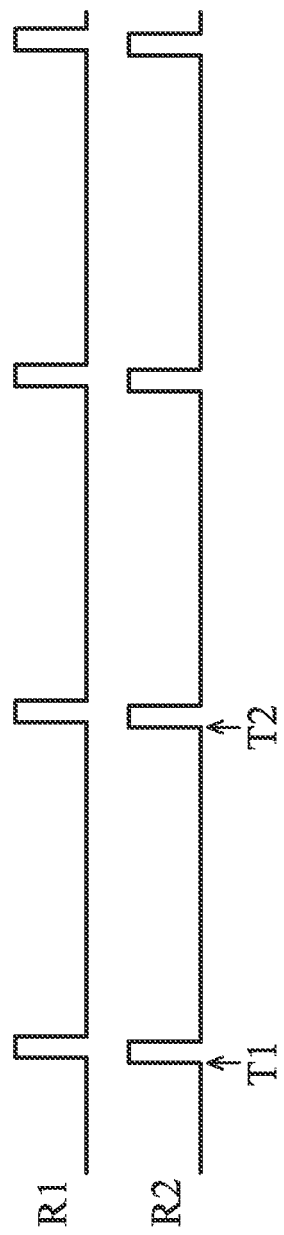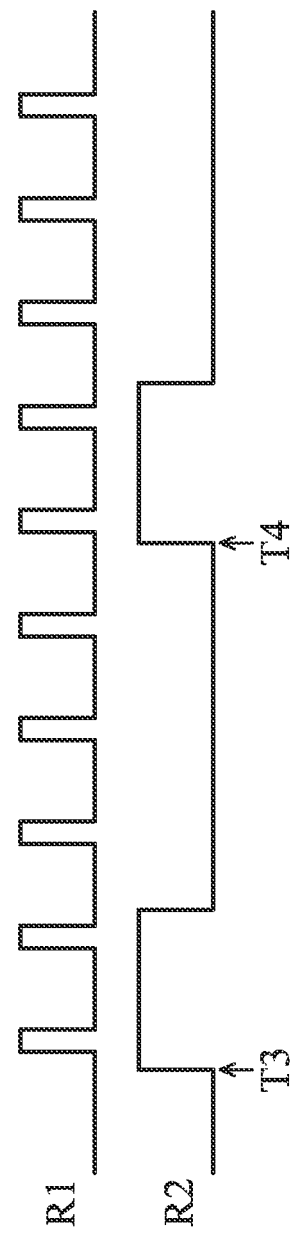

METHODS FOR ONE RADIO MODULE TO LISTEN TO PAGING SIGNALS WITHOUT BREAKING THE DATA TRANSMISSION OF THE OTHER RADIO MODULE OPERATING IN THE CONNECTED MODE AND COMMUNICATION APPARATUSES UTILIZING THE SAME

BACKGROUND OF THE INVENTION

Field of the Invention

The invention relates to communication apparatuses and methods for one radio module to listen to paging signals without breaking the data transmission of the other radio module operating in the connected mode.

Description of the Related Art

The term "wireless" normally refers to an electrical or electronic operation, which is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best-known example of wireless communications is the cellular telephone. Cellular telephones use radio waves to enable an operator to make phone calls to another party, from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. Furthermore, the GSM also uses frequency division multiple access (FDMA) technology. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. Wireless Fidelity (Wi-Fi) is a technology defined by the 802.11b engineering standard that can be used for home networks, mobile phones, and video games to provide a high-frequency wireless local area network. The Long Term Evolution (LTE) program is to bring new technology, new architecture, and new methods into the field of wireless communications, and to provide improved spectral efficiency, reduced latency, and better utilization of radio resources, thereby providing a faster user experience and richer applications and services with less associated cost.

With the advanced development of wireless communications technologies, it is now possible to provide multiple wireless communication services in compliance with different or the same Radio Access Technologies (RAT) by using multiple radio modules in one Mobile Station (MS) or User Equipment (UE). In order to provide optimal communication services for a multi-radio communications apparatus capable of supporting one radio module listening to a paging signal without breaking the data transmission of the other radio module, novel methods for simultaneous data transmission and standby between multiple communications systems are required.

BRIEF SUMMARY OF THE INVENTION

Communications apparatuses are provided. An exemplary embodiment of a communications apparatus comprises a first radio module, a second radio module, and at least two antennas. The first radio module communicates with a first wireless network and provides wireless communication services in compliance with a first radio access technology (RAT). The second radio module communicates with a second wireless network and provides wireless communication services in compliance with a second RAT. At least two antennas shared by the first radio module and the second radio module are for transmitting and receiving radio frequency (RF) signals to and from an air interface. When the first radio module operates in an idle mode and when the timing of the first radio module performing a first receiving activity coincides with the timing of the second radio module performing a second receiving activity, the second radio module uses the antennas to perform the second receiving activity when a first Discontinuous Reception (DRX) cycle duration of the first radio module in the idle mode is shorter than a second DRX cycle duration of the second radio module.

An exemplary embodiment of a communications apparatus comprises a first radio module, a second radio module and at least two antennas. The first radio module communicates with a first wireless network to provide wireless communication services in compliance with a first radio access technology (RAT). The second radio module communicates with a second wireless network to provide wireless communication services in compliance with a second RAT. At least two antennas are shared by the first radio module and the second radio module for transmitting and receiving radio frequency (RF) signals to and from an air interface. When the first radio module operates in a connected mode and when the timing of the first radio module performing a first receiving activity coincides with the timing of the second radio module performing a second receiving activity, the first radio module reports a value of 0 for the Channel Quality Indicator (CQI) to the first wireless network at least once before the time at which the second radio module is to perform the second receiving activity, and then the second radio module uses the antennas to perform the second receiving activity.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 is an exemplary timing diagram showing the receiving activities of the radio modules along the time axis when the DRX cycle duration of the first radio module and the DRX cycle duration of the second radio module are of equal length in scenario 1 according to an embodiment of the invention;

FIG. 5 is an exemplary timing diagram showing the receiving activities of the radio modules along the time axis when the DRX cycle duration of the first radio module is shorter than the DRX cycle duration of the second radio module in scenario 3 according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
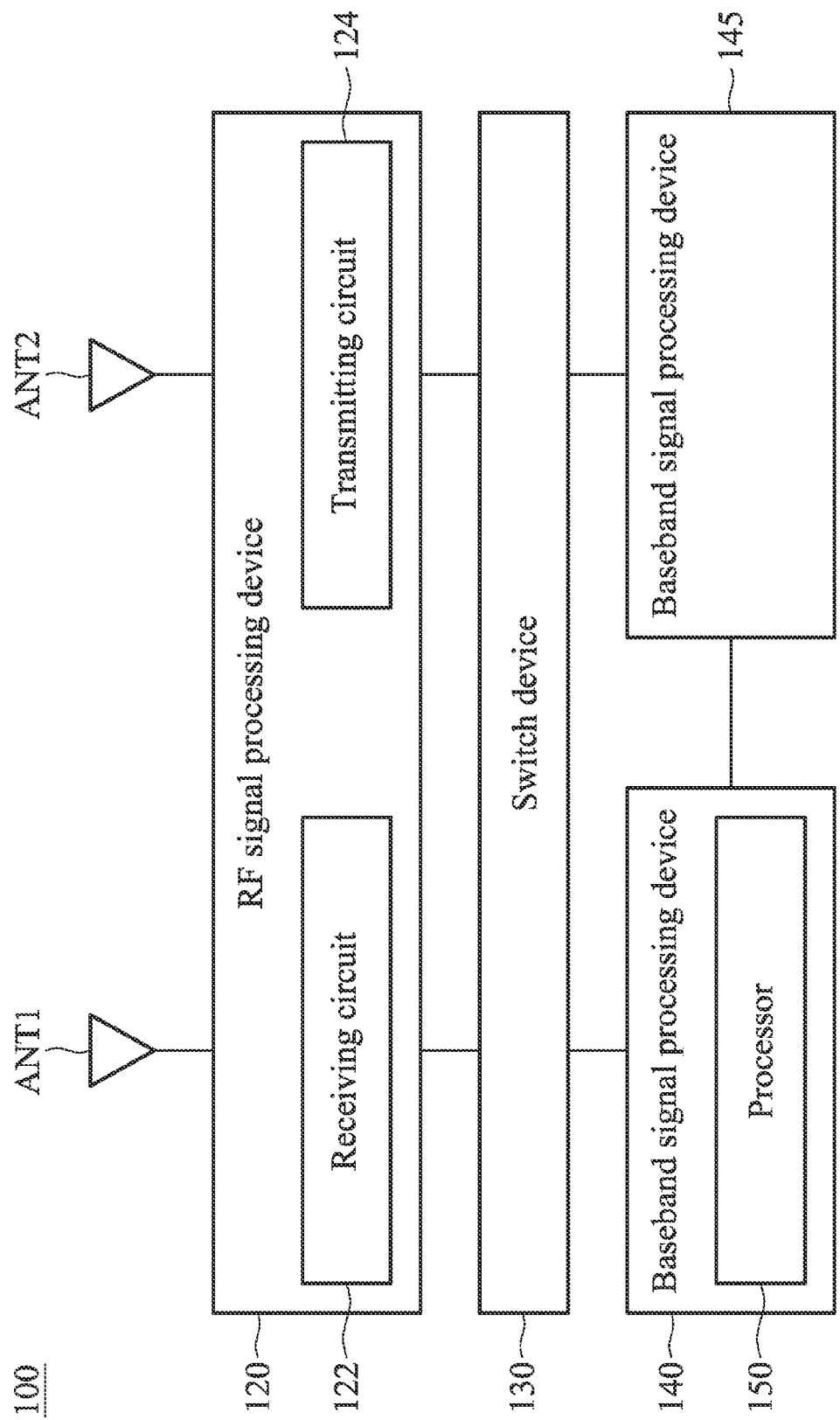
FIG. 1 is an exemplary block diagram of a communications apparatus according to an embodiment of the invention.

FIG. 1 is an exemplary block diagram of a communications apparatus according to an embodiment of the invention. The communications apparatus 100 may comprise at least two antennas ANT1 and ANT2 for transmitting and receiving radio frequency (RF) signals to and from an air interface, an RF signal processing device 120, a switch device 130, at least two baseband signal processing devices 140 and 145, and at least one processor 150. The RF signal processing device 120 may be a general RF signal processing device comprising at least a receiving circuit 122 and a transmitting circuit 124 shared by the baseband signal processing devices 140 and 145.

The receiving circuit 122 is arranged to receive RF signals from the air interface via one or both of the antennas, and process the received RF signals to convert the received RF signals to baseband signals to be processed by the baseband signal processing device 140 or 145. The transmitting circuit 124 is arranged to receive baseband signals from the baseband signal processing devices 140 and 145, convert the received baseband signals to RF signals, and transmit the RF signals to a peer communication apparatus. The receiving circuit 122 and transmitting circuit 124 may comprise a plurality of hardware elements. For example, a power amplifier, a mixer, or others. Note that in some embodiments of the invention, the RF signal processing device 120 may also comprise two receiving circuits and two transmitting circuits, and each receiving circuit and transmitting circuit may be arranged to process the RF signals received from and transmitted to one antenna. Therefore, the invention should not be limited to what is shown in FIG. 1.

The switch device 130 may switch the signal transmitting paths between the two baseband signal processing devices 140 and 145 and the RF signal processing device 120. According to an embodiment of the invention, the switch device 130 may switch the signal transmitting paths in response to the control signal issued by either of the baseband signal processing devices, 140 or 145.

The baseband signal processing devices 140 and 145 may further process the baseband signals to convert the baseband signals to a plurality of digital signals, and process the digital signals, and vice versa. The baseband signal processing devices 140 and 145 may comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 150 may control the operations of the baseband signal processing device 140/145, the RF signal processing device 120 and the switch device 130. According to an embodiment of the invention, the processor 150 may also be arranged to execute the program codes of the software module(s) of the corresponding baseband signal processing device and/or the RF signal processing device. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s).

According to an embodiment of the invention, the RF signal processing device 120 and the baseband signal processing device 140 may be collectively regarded as a first radio module capable of communicating with a first wireless network to provide wireless communication services in compliance with a first Radio Access Technology (RAT), and the RF signal processing device 120 and the baseband signal processing device 145 may be collectively regarded as a second radio module capable of communicating with a second wireless network to provide wireless communication services in compliance with a second RAT, since the RF signal processing device 120 is a general RF signal processing device shared by the baseband signal processing devices 140 and 145.

Note that, in some embodiments of the invention, the processor may also be configured outside of the baseband signal processing device 140, or the communications apparatus 100 may comprise another processor configured inside of the baseband signal processing device 145, each for controlling the operations of the corresponding baseband signal processing device, thus the invention should not be limited to the architecture as shown in FIG. 1. In addition, note that, in order to clarify the concept of the invention, FIG. 1 presents a simplified block diagram, in which only the elements relevant to the invention are shown. However, the invention should not be limited what is shown in FIG. 1.

Note further that in some embodiments of the invention, the communications apparatus 100 may further be extended to comprise more than two antennas, more than two radio modules, and the invention should not be limited what is shown in FIG. 1.

According to the embodiments of the invention, since the communications apparatus (such as the communications apparatus 100 as shown) are equipped with at least two radio modules and each is capable of providing predetermined communication services in compliance with a predetermined RAT, the methods to achieve a goal for one radio module to listen to paging signals without breaking the data transmission of the other radio module operating in the connected mode are introduced.

According to an embodiment of the invention, when the receiving activity of one radio module listening to the paging signal coincides with the receiving activity of the other radio module operating in the connected mode for receiving data, the radio module operating in the connected mode may yield the right to use both the antennas ANT1 and ANT2 (and the corresponding receiving circuit(s)) to the other radio module for listening to the paging signal based on some algorithms as will be illustrated below, without breaking the data transmission of the radio module operating in the connected mode. Note that the term "receiving activity" here refers to the radio activity of receiving RF signals from the wireless network via the antenna(s) and the receiving circuit(s).

According to a preferred embodiment of the invention, one radio module may be an LTE radio module (hereinafter called the first radio module for brevity), and the other radio module may be a GSM radio module, WCDMA radio module, CDMA2000 radio module, TDS-CDMA radio module, or others (hereinafter called the second radio module for brevity). In the following paragraphs, the algorithms of handling the coincident receiving activities are introduced in several scenarios.

Scenario 1: Idle Mode

According to an embodiment of the invention, the processor (for example, the processor 150) of the first radio module may first determine whether the first radio module operates in the RRC_connected mode. If not, the first radio module operates in an idle mode and the processor may arbitrate the right to use all the antennas (and the corresponding receiving circuit(s)) based on the algorithm as illustrated below.

According to an embodiment of the invention, when first radio module operates in an idle mode, the processor may determine whether the Discontinuous Reception (DRX) cycle duration of the first radio module in the idle mode is shorter than the DRX cycle duration of the second radio module. When the DRX cycle duration of the first radio module in the idle mode is shorter than the DRX cycle duration of the second radio module, the first radio module may yield the right to use the antennas ANT1 and ANT2 (and the corresponding receiving circuit(s)) to the second radio module for listening to the paging signal when the timing of the first radio module performing a first receiving activity coincides with the timing of the second radio module performing a second receiving activity.

Figure 2:
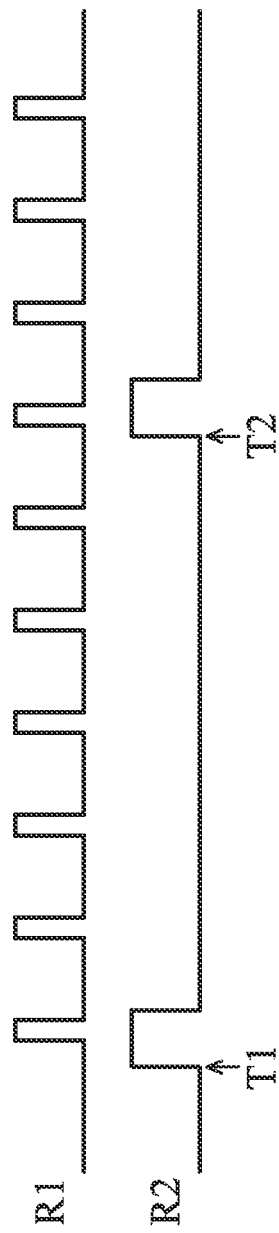
FIG. 2 is an exemplary timing diagram showing the receiving activities of the radio modules along the time axis when the DRX cycle duration of the first radio module is shorter than the DRX cycle duration of the second radio module in scenario 1 according to an embodiment of the invention.

FIG. 2 is an exemplary timing diagram showing the receiving activities of the radio modules along the time axis when the DRX cycle duration of the first radio module is shorter than the DRX cycle duration of the second radio module in scenario 1 according to an embodiment of the invention. As shown in FIG. 2, R1 represents the first radio module, R2 represents the second radio module, the pulses on the right-hand side of R1 shows the predetermined receiving activities to be performed by R1, and the pulses on the right-hand side of R2 shows the predetermined receiving activities to be performed by R2. In this example, the timing of the first radio module performing the receiving activities coincides with that of the second radio module at times T1 and T2. Therefore, in the embodiment of the invention, the first radio module may yield the right to use the antennas ANT1 and ANT2 (and the corresponding receiving circuit(s)) to the second radio module for listening to the paging signal at times T1 and T2. Note that, in the embodiments of the invention, the timing of performing a receiving activity may comprise the time required for setting up the receiving circuit and the corresponding software/hardware devices, performing timing and frequency synchronization for the radio module, and the actual On period for turning on the receiving circuit, the antenna(s), and the corresponding software/hardware devices.

In addition, in the embodiment of the invention, when the DRX cycle duration of the first radio module in the idle mode is longer than the DRX cycle duration of the second radio module, the first radio module may not yield the right to use the antennas ANT1 and ANT2 (and the corresponding receiving circuit(s)) to the second radio module for listening to the paging signal when the timing of the first radio module to perform a first receiving activity coincides with the timing of the second radio module to perform a second receiving activity.

Figure 3:
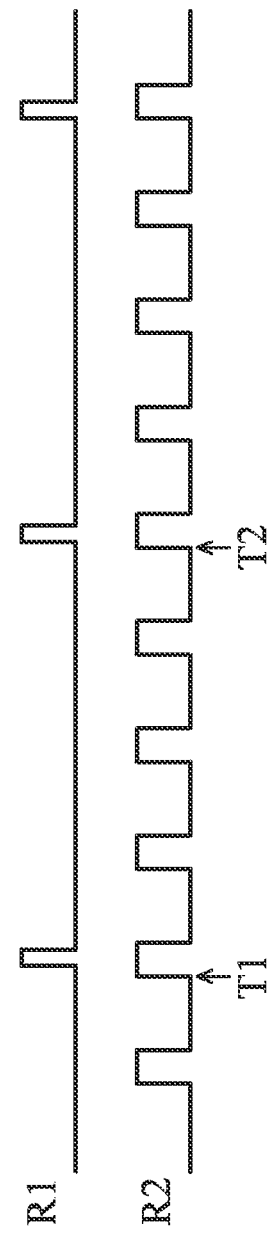
FIG. 3 is an exemplary timing diagram showing the receiving activities of the radio modules along the time axis when the DRX cycle duration of the first radio module is longer than the DRX cycle duration of the second radio module in scenario 1 according to an embodiment of the invention.

FIG. 3 is an exemplary timing diagram showing the receiving activities of the radio modules along the time axis when the DRX cycle duration of the first radio module is longer than the DRX cycle duration of the second radio module in scenario 1, according to an embodiment of the invention. In this example, the timing of the first radio module performing the receiving activities coincides with that of the second radio module at times T1 and T2, and the first radio module gets the right to use the antennas ANT1 and ANT2 (and the corresponding receiving circuits) at times T1 and T2.

In addition, in the embodiment of the invention, when the DRX cycle duration of the first radio module in the idle mode and the DRX cycle duration of the second radio module are of equal length, the first radio module and the second radio module use the antennas in turn to perform the first receiving activity and the second receiving activity.

FIG. 4 is an exemplary timing diagram showing the receiving activities of the radio modules along the time axis when the DRX cycle duration of the first radio module and the DRX cycle duration of the second radio module are of equal length in scenario 1, according to an embodiment of the invention. In this example, the timing of performing the first radio module's receiving activities coincides with that of the second radio module at times T1 and T2. Therefore, the first radio module and the second radio module get the right to use the antennas ANT1 and ANT2 in turn at times T1 and T2. To be more specific, the first radio module may use the antennas ANT1 and ANT2 to perform the first receiving activity at time T1 and the second radio module may use the antennas ANT1 and ANT2 to perform the second receiving activity at time T2.

Scenario 2: Connected Mode without DRX

According to an embodiment of the invention, when the processor (for example, the processor 150) of the first radio module determines that the first radio module operates in the RRC_connected mode, the processor may further determine whether the DRX in the connected mode is applied. If not, the processor may arbitrate the right to use all the antennas (and the corresponding receiving circuits) based on the algorithm as illustrated below.

According to an embodiment of the invention, when the first radio module operates in a connected mode without DRX (that is, the DRX is not applied), and when the timing of the first radio module performing the first receiving activity coincides with the timing of the second radio module performing the second receiving activity, the processor (for example, the processor 150) of the first radio module may report a value of 0 for the Channel Quality Indicator (CQI) to the first wireless network at least once before the time at which the second radio module is to perform the second receiving activity. According to an embodiment of the invention, the CQI=0 represents an Out Of Range (OOR) condition, and the CQI may be reported to the wireless network through the uplink control or shared channel.

For example, suppose that it takes k sub-frames for the first wireless network to process and decode the data received from the communications apparatus 100, and the second radio module has to perform the second receiving activity in the l-th sub-frame: it is preferable for the first radio module to report a CQI value of 0 to the first wireless network before the (l−k)-th sub-frame to ensure no data transmission after the l-th sub-frame. Then, the second radio module may use the antennas to perform the second receiving activity at the l-th sub-frame without causing the first radio module to lose data. In this manner, no data loss of the first radio module would occur and the first wireless network may further save transmission bandwidth.

Note that when the Hybrid Automatic Repeat reQuest (HARQ) mechanism is applied, the first radio module may also report the CQI value as 0 to the first wireless network in the l-th sub-frame or during the time from the (l−k)-th sub-frame to the l-th sub-frame, and the invention should not be limited thereto.

In addition, in the embodiment of the invention, the first radio module may further report a valid CQI value other than 0 to the first wireless network at least once after reporting the CQI value of 0. The valid value may be 1 or a previously reported CQI value. For example, suppose that it takes k sub-frames for the first wireless network to process and decode the data received from a mobile terminal, and the second radio module's second receiving activity will end in the m-th sub-frame; it is preferable for the first radio module to report a valid value other than 0 for the CQI to the first wireless network before the (m-k)-th sub-frame. Note that, in an embodiment of the invention, when the estimated mobility of the communications apparatus 100 is high or medium, the first radio module may report a CQI value of 1 to the first wireless network, and when the estimated mobility of the communications apparatus 100 is low or zero, the first radio module may report the CQI value as a previously reported CQI value that has been reported to the first wireless network before reporting CQI=0. After the first radio module regains the right to use the antennas (and the corresponding receiving circuits), the first radio module may report a CQI value based on currently received control channel signals.

Scenario 3: Connected Mode with DRX and Collision Occurs in DRX on Period or the Retransmission Period According to an embodiment of the invention, when the processor (for example, the processor 150) of the first radio module determines that the DRX is applied, the processor may further determine whether the timing of the second radio module to perform the second receiving activity coincides with the DRX On period or the retransmission period of the first radio module. If so, the processor may arbitrate the right to use all the antennas (and the corresponding receiving circuits) based on the algorithm as illustrated below.

Here, the DRX On period refers to the time during which the first radio module in the connected mode is waking up to receive the data from the first wireless network, and the retransmission period refers the time during which the first radio module receives the retransmitted data from the first wireless network. Note that, unlike the GSM and UMTS systems, in LTE systems, the DRX operation can be applied not only in the idle mode, but also in the connected mode, for power saving purposes, in particular to conserve the battery power of the communications apparatus.

According to an embodiment of the invention, when the timing of the second radio module performing the second receiving activity coincides with the DRX On period or the retransmission period of the first radio module, the processor may determine whether to yield the right to use all the antennas (and the corresponding receiving circuits) based on the DRX cycle durations of the first and second radio modules.

In scenario 3, according to an embodiment of the invention, when a DRX cycle duration of the first radio module in the connected mode is shorter than the DRX cycle duration of the second radio module, the first radio module may report a value of 0 for the CQI to the first wireless network at least once before the time at which the second radio module is to perform the second receiving activity, and then yield the right to use the antennas ANT1 and ANT2 (and the corresponding receiving circuit(s)) to the second radio module for listening to the paging signal when the timing of the first radio module during the DRX On period or retransmission period performing the first receiving activity coincides with the timing of the second radio module performing the second receiving activity.

FIG. 5 is an exemplary timing diagram showing the receiving activities of the radio modules along the time axis when the DRX cycle duration of the first radio module is shorter than the DRX cycle duration of the second radio module in scenario 3, according to an embodiment of the invention. In the embodiment of the invention, the first radio module may report a CQI value of 0 to the first wireless network before times T3 and T4, and then may yield the right to use the antennas ANT1 and ANT2 (and the corresponding receiving circuits) to the second radio module for listening to the paging signal at times T3 and T4. In addition, the first radio module may further report a valid CQI value other than 0 to the first wireless network at least once at the proper time after reporting the CQI value as 0. The proper time may, for example, be before the first radio module's next On period or retransmission period. The concepts of reporting a CQI value of 0 and as a valid value other than 0 after reporting CQI=0 are similar to those illustrated in scenario 2, and illustrations are omitted here for brevity.

In addition, in the embodiment of the invention, when the DRX cycle duration of the first radio module in the connected mode is longer than the DRX cycle duration of the second radio module, the first radio module may not yield the right to use the antennas ANT1 and ANT2 (and the corresponding receiving circuit(s)) to the second radio module for listening to the paging signal when the timing of the first radio module performing the first receiving activity coincides with the timing of the second radio module performing the second receiving activity.

Figure 6:
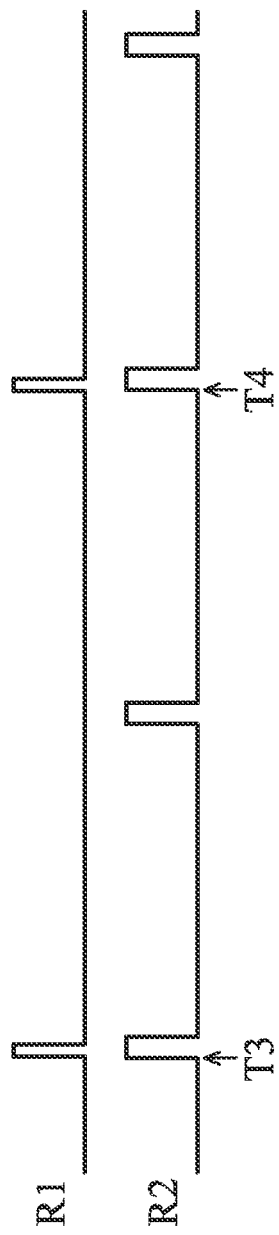
FIG. 6 is an exemplary timing diagram showing the receiving activities of the radio modules along the time axis when the DRX cycle duration of the first radio module is longer than the DRX cycle duration of the second radio module in scenario 3 according to an embodiment of the invention.

FIG. 6 is an exemplary timing diagram showing the receiving activities of the radio modules along the time axis when the DRX cycle duration of the first radio module is longer than the DRX cycle duration of the second radio module in scenario 3, according to an embodiment of the invention. In this example, although the timing of the first radio module performing the receiving activities during the DRX On period or retransmission period coincides with that of the second radio module at times T3 and T4, the first radio module still uses the antennas ANT1 and ANT2 (and the corresponding receiving circuits) at times T3 and T4.

In addition, in the embodiment of the invention, when the DRX cycle duration of the first radio module in the connected mode and the DRX cycle duration of the second radio module are of equal length, the first radio module and the second radio module use the antennas in turn to perform the first receiving activity and the second receiving activity.

Figure 7:
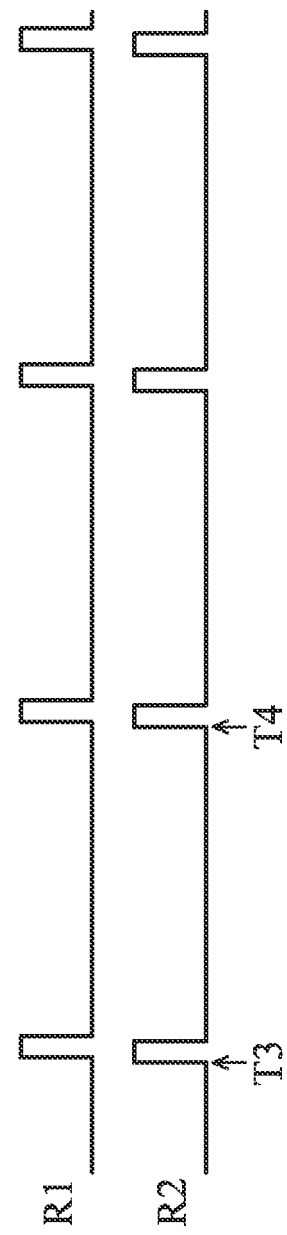
FIG. 7 is an exemplary timing diagram showing the receiving activities of the radio modules along the time axis when the DRX cycle duration of the first radio module and the DRX cycle duration of the second radio module are of equal length in scenario 3 according to an embodiment of the invention.

FIG. 7 is an exemplary timing diagram showing the receiving activities of the radio modules along the time axis when the DRX cycle duration of the first radio module and the DRX cycle duration of the second radio module are of equal length in scenario 3, according to an embodiment of the invention. In this example, the first radio module and the second radio module get the right to use the antennas ANT1 and ANT2 in turn at times T3 and T4. To be more specific, the first radio module may use the antennas ANT1 and ANT2 to perform the receiving activity at time T3 and the second radio module may use the antennas ANT1 and ANT2 to perform the receiving activity at time T4.

The first radio module may report a CQI value of 0 to the first wireless network before time T4, and then may yield the right to use the antennas ANT1 and ANT2 (and the corresponding receiving circuits) to the second radio module for listening to the paging signal at time T4. In addition, the first radio module may further report the CQI as a valid value other than 0 to the first wireless network at least once at the proper time after reporting a CQI value of 0. The proper time may, for example, be before the next on period or retransmission period. The concepts of reporting the CQI value as 0 and as a valid value other than 0 are similar to those illustrated in scenario 2, and illustrations are omitted here for brevity.

Note that, in cases in which the DRX cycle duration of the first radio module and the DRX cycle duration of the second radio module are of equal length, and in cases in which the DRX cycle duration of the first radio module is longer than the DRX cycle duration of the second radio module as in scenario 3, if a last paging signal is not successfully decoded by the second radio module, the first radio module may yield the right to use the antennas to the second radio module at the next paging occasion of the second radio module. In addition, if the second radio module didn't get the right to use the antennas at the last paging occasion, the first radio module may also yield the right to use the antennas to the second radio module at the next paging occasion of the second radio module.

Scenario 4: Connected Mode with DRX and Inactivity Timer

According to an embodiment of the invention, when the processor (for example, the processor 150) of the first radio module determines that the DRX is applied and the timing of the second radio module performing the second receiving activity does not coincide with the DRX On period or the retransmission period of the first radio module, the processor further determines whether the inactivity timer of the first radio module has not expired. If so, the processor may arbitrate the right to use all the antennas (and the corresponding receiving circuit(s)) based on the algorithm as illustrated below.

According to an embodiment of the invention, when the DRX cycle duration of the first radio module in the connected mode with DRX is not shorter (for example, it is longer or of equal length) than the DRX cycle duration of the second radio module, and when the timing of the second radio module performing the second receiving activity coincides with the period of time during which the inactivity timer does not expire, the first radio module may not yield the right to use the antennas ANT1 and ANT2 (and the corresponding receiving circuit(s)) to the second radio module for listening to the paging signal.

Figure 8:
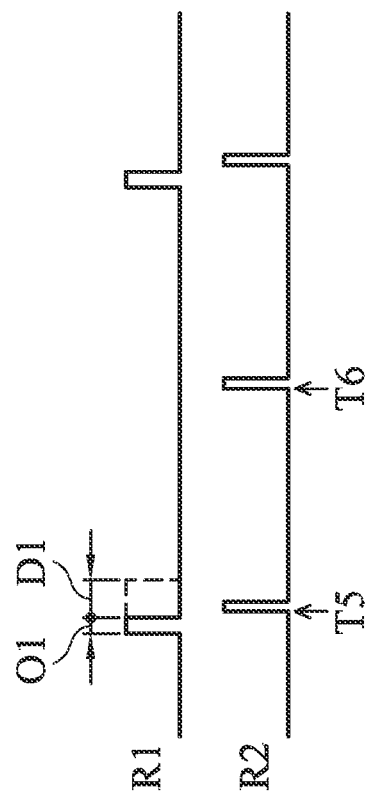
FIG. 8 is an exemplary timing diagram showing the receiving activities of the radio modules along the time axis when the DRX cycle duration of the first radio module is longer than the DRX cycle duration of the second radio module in scenario 4 according to an embodiment of the invention.

FIG. 8 is an exemplary timing diagram showing the receiving activities of the radio modules along the time axis when the DRX cycle duration of the first radio module is longer than the DRX cycle duration of the second radio module in scenario 4, according to an embodiment of the invention. As shown in FIG. 8, the time T5 for the second radio module to perform the second receiving activity coincides with the duration D1 during which the inactivity timer does not expire. Therefore, the first radio module may not yield the right to use the antennas ANT1 and ANT2 (and the corresponding receiving circuit(s)) to the second radio module, and may still use the antennas ANT1 and ANT2 to perform the receiving activity during the duration D1. Note that when an inactive timer is assigned by the wireless network and when the first radio has received data during a DRX On period O1 as shown in FIG. 8, the first radio module has to keep turning on after the DRX On period to perform a continuous receiving activity during the duration D1. After finishing the continuous receiving activity during the duration D1, the first radio module may then yield the right to use the antennas to the second radio module at the next paging occasion (for example, at time T6 as shown in FIG. 8) of the second radio module.

Note that, in cases in which the DRX cycle duration of the first radio module and the DRX cycle duration of the second radio module are of equal length, or in cases in which the DRX cycle duration of the first radio module is longer than the DRX cycle duration of the second radio module as in scenario 4, if a last paging signal is not successfully decoded by the second radio module, the first radio module may yield the right to use the antennas to the second radio module at the next paging occasion of the second radio module. In addition, if the second radio module didn't get the right to use the antennas at the last paging occasion, the first radio module may also yield the right to use the antennas to the second radio module at the next paging occasion (for example, at time T6 as shown in FIG. 8) of the second radio module.

On the other hand, when the DRX cycle duration of the first radio module in the connected mode with DRX is shorter than the DRX cycle duration of the second radio module, and when the timing of the second radio module performing the second receiving activity coincides with the period during which the inactivity timer does not expire, the first radio module may not yield the right to use the antennas ANT1 and ANT2 (and the corresponding receiving circuit(s)) to the second radio module for listening to the paging signal. However, after the inactivity timer of the first radio module expires, the first radio module reports a value of 0 for the CQI to the first wireless network at least once before the time at which the second radio module is to perform a subsequent second receiving activity, which may have a performance time coinciding with that of a subsequent first receiving activity. Then, the second radio module may get the right to use the antennas ANT1 and ANT2 (and the corresponding receiving circuit(s)) to perform the subsequent second receiving activity.

Figure 9:
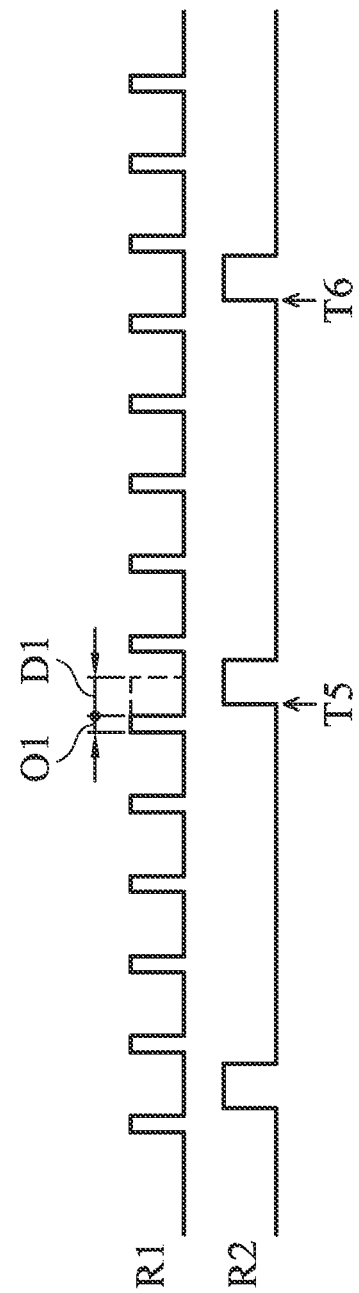
FIG. 9 is an exemplary timing diagram showing the receiving activities of the radio modules along the time axis when the DRX cycle duration of the first radio module is shorter than the DRX cycle duration of the second radio module in scenario 4 according to an embodiment of the invention.

FIG. 9 is an exemplary timing diagram showing the receiving activities of the radio modules along the time axis when the DRX cycle duration of the first radio module is shorter than the DRX cycle duration of the second radio module in scenario 4, according to an embodiment of the invention. As shown in FIG. 9, the time T5 for the second radio module performing the second receiving activity coincides with the duration D1 during which the inactivity timer does not expire. Therefore, the first radio module may not yield the right to use the antennas ANT1 and ANT2 (and the corresponding receiving circuit(s)) to the second radio module, and may still use the antennas ANT1 and ANT2 to perform the first receiving activity during the duration D1. Note that when the first radio has received data during an On period O1 as shown in FIG. 9, the first radio module has to keep turning on after the On period for performing a continuous receiving activity during the duration D1. After finishing the continuous receiving activity during the duration D1, the first radio module may then yield the right to use the antennas to the second radio module at the next paging occasion (for example, at time T6 as shown in FIG. 9) of the second radio module.

According to an embodiment of the invention, the first radio module may report a value of 0 for the CQI to the first wireless network before time T6, and then may yield the right to use the antennas ANT1 and ANT2 (and the corresponding receiving circuit(s)) to the second radio module for listening to the paging signal at time T6. In addition, the first radio module may further report a valid value other than 0 for the CQI to the first wireless network at least once at the proper time after reporting the CQI value as 0. The proper time may, for example, be before a subsequent receiving activity of the first radio module. The concepts of reporting the CQI value as 0 and as a valid value other than 0 are similar to those illustrated in scenario 2, and illustrations are omitted here for brevity.

Note that, in cases in which the DRX cycle duration of the first radio module and the DRX cycle duration of the second radio module are of equal length, or in cases in which the DRX cycle duration of the first radio module is longer than the DRX cycle duration of the second radio module as in scenario 4, if a last paging signal is not successfully decoded by the second radio module, the first radio module may yield the right to use the antennas to the second radio module at the next paging occasion of the second radio module. In addition, if the second radio module didn't get the right to use the antennas at the last paging occasion, the first radio module may also yield the right to use the antennas to the second radio module at the next paging occasion (for example, at time T6 as shown in FIG. 8) of the second radio module.

In the embodiments of the invention, based on the algorithms in different scenarios for arbitrating the right to use the antennas and the corresponding receiving circuits as illustrated above, the goal of having one radio module be able to listen to paging signals without breaking the data transmission of the other radio module can be achieved. In addition, the transmission bandwidth of the wireless network can also be utilized more efficiently.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a first radio circuit, communicating with a first wireless network and providing wireless communication services in compliance with a first radio access technology (RAT);
   a second radio circuit, communicating with a second wireless network and providing wireless communication services in compliance with a second RAT; and
   at least two antennas, shared by the first radio circuit and the second radio circuit for transmitting and receiving radio frequency (RF) signals to and from an air interface,
   wherein when the first radio circuit operates in an idle mode and when the timing of the first radio circuit performing a first receiving activity coincides with the timing of the second radio circuit performing a second receiving activity, the second radio circuit uses the at least two antennas to perform the second receiving activity when a Discontinuous Reception (DRX) cycle duration of the first radio circuit in the idle mode is shorter than a DRX cycle duration of the second radio circuit, and
   wherein when the first radio circuit operates in a connected mode with DRX and when the timing of the first radio circuit performing the first receiving activity coincides with the timing of the second radio circuit performing the second receiving activity, the first radio circuit uses the at least two antennas to perform the first receiving activity when an inactivity timer of the first radio circuit has not expired;
   wherein the inactivity timer is assigned by the first wireless network and starts after the first radio circuit has received data.

2. The communications apparatus as claimed in claim 1, wherein when the first radio circuit operates in a connected mode and when the timing of the first radio circuit performing the first receiving activity coincides with the timing of the second radio circuit performing the second receiving activity, the first radio circuit reports a value of 0 for a Channel Quality Indicator (CQI) to the first wireless network at least once before the time at which the second radio circuit is to perform the second receiving activity, and then the second radio circuit uses the antennas to perform the second receiving activity.

3. The communications apparatus as claimed in claim 1, wherein when the first radio circuit operates in the idle mode and when the timing of the first radio circuit performing the first receiving activity coincides with the timing of the second radio circuit performing the second receiving activity, the first radio circuit and the second radio circuit use the antennas in turn to perform the first receiving activity and the second receiving activity when the DRX cycle duration of the first radio circuit in the idle mode and the DRX cycle duration of the second radio circuit are of equal length.

4. The communications apparatus as claimed in claim 1, wherein when the first radio circuit operates in a connected mode without DRX and when the timing of the first radio circuit performing the first receiving activity coincides with the timing of the second radio circuit performing the second receiving activity, the first radio circuit reports a value of 0 for a CQI to the first wireless network at least once before the time at which the second radio circuit is to perform the second receiving activity and then the second radio circuit uses the antennas to perform the second receiving activity.

5. The communications apparatus as claimed in claim 4, wherein the first radio circuit further reports a valid value other than 0 for the CQI to the first wireless network at least once after reporting the CQI value as 0.

6. The communications apparatus as claimed in claim 1, wherein when the first radio circuit operates in a connected mode with DRX and when the timing of the first radio circuit performing the first receiving activity coincides with the timing of the second radio circuit performing the second receiving activity, the first radio circuit reports a value of 0 for a CQI to the first wireless network at least once before the time at which the second radio circuit is to perform the second receiving activity and then the second radio circuit uses the antennas to perform the second receiving activity.

7. The communications apparatus as claimed in claim 6, wherein the first radio circuit reports a value of 0 for the CQI to the first wireless network when the DRX cycle duration of the first radio circuit in the connected mode is shorter than the DRX cycle duration of the second radio circuit.

8. The communications apparatus as claimed in claim 6, wherein the first radio circuit further reports a valid value other than 0 for the CQI to the first wireless network at least once after reporting the CQI value as 0.

9. The communications apparatus as claimed in claim 1, wherein when the DRX cycle duration of the first radio circuit in the connected mode with DRX is shorter than the DRX cycle duration of the second radio circuit, after the inactivity timer of the first radio circuit expires, the first radio circuit reports a value of 0 for a CQI to the first wireless network at least once before the time at which the second radio circuit is to perform a subsequent second receiving activity, which has a performance time coinciding with that of a subsequent first receiving activity, and then the second radio circuit uses the antennas to perform the subsequent second receiving activity.

10. The communications apparatus as claimed in claim 9, wherein the first radio circuit further reports a valid value other than 0 for the CQI to the first wireless network at least once after reporting the CQI value as 0.

11. A communications apparatus, comprising:
a first radio circuit, communicating with a first wireless network and providing wireless communication services in compliance with a first radio access technology (RAT);
a second radio circuit, communicating with a second wireless network and providing wireless communication services in compliance with a second RAT; and
at least two antennas, shared by the first radio circuit and the second radio circuit for transmitting and receiving radio frequency (RF) signals to and from an air interface,
wherein when the first radio circuit operates in a connected mode and when the timing of the first radio circuit performing a first receiving activity coincides with the timing of the second radio circuit performing a second receiving activity, the first radio circuit reports a value of 0 for a Channel Quality Indicator (CQI) to the first wireless network at least once before the time at which the second radio circuit is to perform the second receiving activity, and then the second radio circuit uses the at least two antennas to perform the second receiving activity, and
wherein when the first radio circuit operates in the connected mode with DRX and when an inactivity timer of the first radio circuit has not expired, the first radio circuit uses the at least two antennas to perform a first continuous receiving activity when the timing of the first radio circuit performing the first continuous receiving activity coincides with the timing of the second radio circuit performing the second receiving activity;
wherein the inactivity timer is assigned by the first wireless network and starts after the first radio circuit has received data.

12. The communications apparatus as claimed in claim 11, wherein the first radio circuit further reports a valid value other than 0 for the CQI to the first wireless network at least once after reporting the CQI value as 0.

13. The communications apparatus as claimed in claim 11, wherein the first radio circuit reports a value of 0 for the CQI to the first wireless network when the first radio circuit operates in the connected mode with DRX and when a Discontinuous Reception (DRX) cycle duration of the first radio circuit in the connected mode is shorter than a DRX cycle duration of the second radio circuit.

14. The communications apparatus as claimed in claim 11, wherein the first radio circuit further reports a value of 0 for the CQI to the first wireless network at least once after the inactivity timer of the first radio circuit expires, and then the second radio circuit uses the antennas to perform a subsequent second receiving activity, which has a performance time coinciding with that of a subsequent first receiving activity.

15. The communications apparatus as claimed in claim 11, wherein when the first radio circuit operates in an idle mode and when the timing of the first radio circuit performing the first receiving activity coincides with the timing of the second radio circuit performing the second receiving activity, the second radio circuit uses the antennas to perform the second receiving activity when a Discontinuous Reception (DRX) cycle duration of the first radio circuit in the idle mode is shorter than a DRX cycle duration of the second radio circuit.

16. The communications apparatus as claimed in claim 15, wherein the first radio circuit and the second radio circuit use the antennas in turn when the DRX cycle duration of the first radio circuit in the idle mode and the DRX cycle duration of the second radio circuit are of equal length.

* * * * *